Jan. 2, 1951     R. DORAND     2,536,041
PIVOTED BLADE AIRSCREW WITH AUTOMATIC PITCH ADJUSTMENT
Filed April 2, 1947
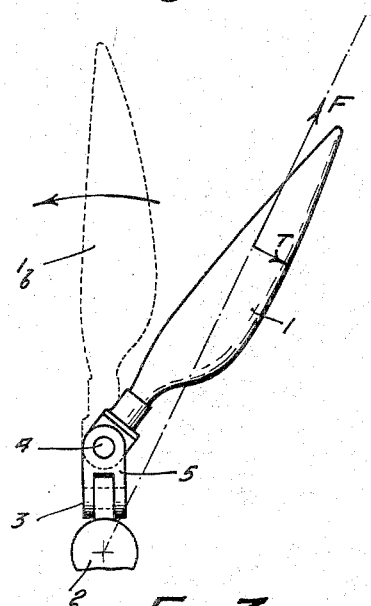
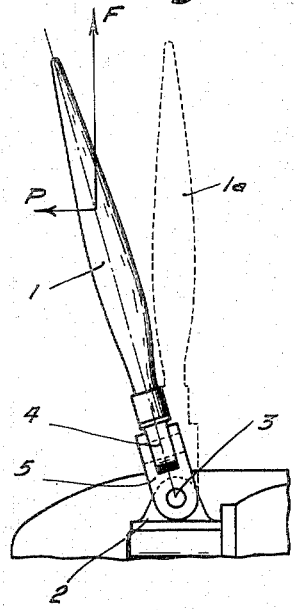
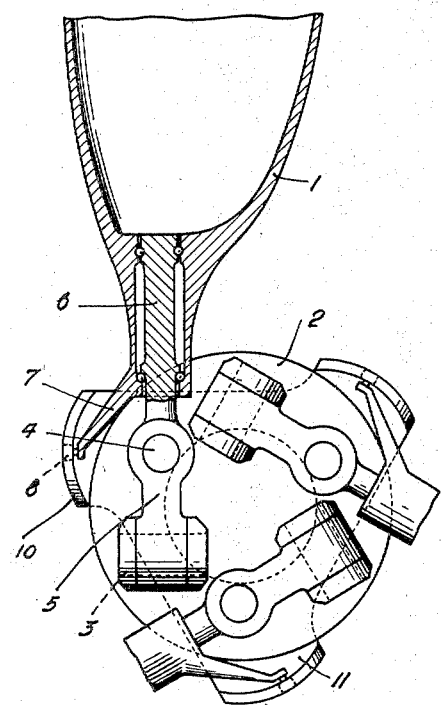
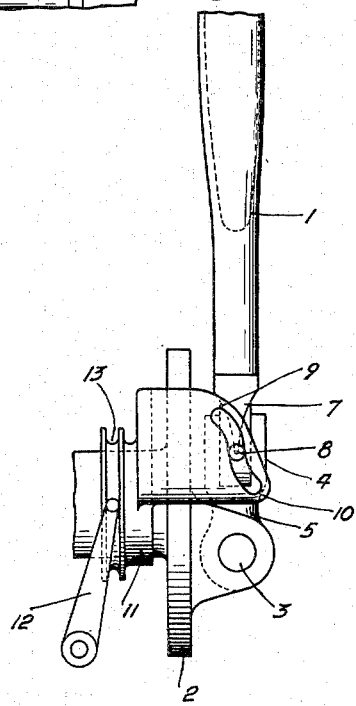
INVENTOR:
RENE DORAND
BY *Michael S. Striker*
AGENT.

Patented Jan. 2, 1951

2,536,041

UNITED STATES PATENT OFFICE 2,536,041

PIVOTED BLADE AIRSCREW WITH AUTOMATIC PITCH ADJUSTMENT

René Dorand, Billancourt, France

Application April 2, 1947, Serial No. 738,792
In France April 16, 1946

2 Claims. (Cl. 170—160.56)

The airscrews used to this day for propelling aircraft are generally constituted by blades of solid cross-section fitted into a hub. The solid cross-section of said blades is rendered necessary by the important stresses developed in the hub zone into which they are fitted, which stresses are due principally to centrifugal straining and to the flexional strains corresponding to aerodynamic stresses, and also by the necessity of aerodynamically reducing the lift-drag ratio of the blade in particular in the vicinity of its fitting zone. The major part of the material is consequently concentrated in the vicinity of the axis of minimum flexional inertia of the cross-sections and it is used under conditions which are very far from optimum conditions as far as the resistance of the material is considered. By reason of the considerable straining in said zone of fitting of the blade inside the hub, the execution of hollow and lighter blades allowing a better use of material has appeared as a difficult problem.

Moreover, the considerable weight of each blade provides for the appearance of important centrifugal tractional stresses of the order of several tens of tons generally applied to the fitting zone of the blades. By reason of these important centrifugal tractional stresses, it is necessary in the case of airscrews having a pitch that is variable during flight, as is in common use for adaptation to different running conditions, to use for the blades thrust bearings having a considerable load capacity.

Now, the friction of the bearings leads to consider the stresses that are to be applied for ensuring a variation in the pitch of the propeller blades, said stresses being provided only by automatic control means chiefly when it is desired to provide for an automatic variation in pitch in order to adapt the angle of incidence of the blades to the running conditions of the engine and of the aircraft. This leads to a difficult mechanical construction and to an increase in weight.

It has been attempted to remove these drawbacks and, according to one of the methods proposed for reaching this result, the blades have been pivotally secured to the hub so as to cancel the fixing moment. The flexural moments throughout the blade are then reduced to a considerable extent which allows executing a lighter blade by reason of the cross-section being recessed and lighter material being used. The gain in weight obtained thereby has as a consequence a reduction in the centrifugal stresses and increases the possibilities of making the blade lighter and this advantage is more and more considerable as points are considered that are nearer the fitting zone. Of course the thrust bearings for the blades are relieved consequently by a corresponding amount.

The parasitical resistances produced by the friction on the thrust bearings during pitch adjustment are also reduced, whereby the automatic pitch control may be executed more easily.

The automatic adjustment of pitch in propelling airscrews provided with pivoted blades of the type mentioned hereinabove consists in making use of the very variation of the two sloping angles of each blade with reference to a radius normal to the axis of rotation of the propeller and with reference to the plane of rotation normal to said axis; said variation depends on the action of centrifugal force and of aerodynamic stresses and may therefore serve for producing automatic variations in pitch so as to conform the pitch to the thrust, to the driving torque and to the speed of rotation of the engine.

My invention has for its subject-matter to improve the automatic adjustment of pitch in propelling airscrews of the aforesaid type by increasing the ratio of the pitch change angle to the forward pivoting angle of the blades.

To this end, the thrust axis of each blade is positioned beyond the axis of rotation of the airscrew with respect to the blade.

I will now describe, by way of example and by no means in a limiting sense, a form of execution of an arrangement according to my invention, as illustrated diagrammatically in accompanying drawings wherein:

Fig. 1 is a front view of the pivoted propelling airscrew blade;

Fig. 2 is a side view thereof;

Fig. 3 is a front view, partly sectional, with an automatic pitch changing arrangement according to my invention;

Lastly, Fig. 4 is a side view of said arrangement.

If we consider an airscrew with a blade as illustrated in Figs. 1 and 2, each blade 1 is connected to the hub 2 by means of a connection constituted by a tangential articulation 3 and an articulation 4 normal to the plane of rotation; it is apparent that under the action of aerodynamic forces the blade considered assumes a position oblique with reference to the radius of the circle normal to the axis of rotation.

Under the action of the thrust P parallel to the axis of rotation, the blade 1, pivoting around the tangential pivotal link, moves forwardly with reference to the position $1a$ (Fig. 2) in which the centrifugal force F would hold it if it were to act alone, gravity being negligible.

Similarly under the action of the tangential stress T that produces the resisting torque round the axis of rotation, the blade 1 moves against the direction of rotation from the position $1b$ (Fig. 1) in which centrifugal force F would hold it if it were acting alone. In accordance with the composition of aerodynamic and centrifugal forces, the two sloping angles depend, on the one hand, on centrifugal force, i. e., on the speed of rotation and, on the other hand, on the thrust and the resisting torque respectively.

The two angles of inclination defined hereinabove of the pivoted blade are used for obtaining an automatic adjustment of the pitch of the blade in order to conform it with the rates of running of the engine and of the aircraft, the means for securing the blade to the hub including then in addition to the two above disclosed pivotal links a radial pivotal link, including a thrust bearing, for modifying the angle of incidence of the blade, which is controlled by a suitable mechanical system controlled in its turn by the inclination angles of the blade considered.

In the arrangements disclosed hereinafter, each blade 1 is connected with the hub 2 through a link 5 including a pivot 3 tangential to the plane of rotation and a pivot 4 normal to said plane. The blade may moreover pivot, in order to provide for pitch adjustment, round its radial axis through the agency of the thrust bearing 6. In this form of execution the fixing zone of the blade in the hub is rigid with the lever 7 the end of which includes a projection 8 moving in the groove 9 of a cam 10 assuming the shape of a sector of a cylinder member and rigid, if required, with the hub 2.

According to my invention, in order to increase the ratio of the pitch change angle to the forward pivoting angle of the blade, the thrust pivot 3 is positioned beyond the axis of rotation of the airscrew with respect to the blade 1, that is to say beyond a diametrical plane of the airscrew parallel to the axis of said pivot.

For the same purpose, in order to increase the drag movements of the blades 1, each pivot 4 is as near as possible of the axis of rotation of the airscrew.

The outline of the cam groove 9 is defined in a manner such that any variation in the driving torque providing a modification in the angular setting of the blade in its plane of rotation and consequently a displacement of the projection 8 on the lever 7 in the groove of the cam 9, produces a predetermined variation in the angle of incidence of the blade. Moreover, the inclination of the blade in a plane normal to the plane of rotation, which inclination is due to a variation in the thrust, produces through the relative displacement of the cam 10 with reference to the blade a suitable change in pitch, provided the location of the projection 8 with reference to the blade and its pivots is suitably selected.

A modification in the speed of rotation of the motor which leads to a variation in the centrifugal force has also for its result a modification of the angular setting of the blade and consequently a variation in pitch.

As more particularly apparent in Fig. 4, the cams 10 of the different blades may be secured on a plate 11 concentric with the hub, and adapted to slide axially with reference to the latter while rotating in unison therewith.

The sliding movement of the plate 11, controlled by the pilot or a servo-motor through a fork 12 cooperating with a circular groove 13 in said plate allows, if required, the execution of a complementary adjustment of the pitch of the blade or else reaching certain particular positions of said blade corresponding for instance to pitch reversal and which are independent of normal operation.

Obviously the above described form of execution of an embodiment illustrated in accompanying drawings has been given out solely by way of example and by no means in a limiting sense and the principle which forms the basis of the invention may be executed through any suitable means including levers, cams, gears, or any like suitable contrivance producing a similar result and applied to airscrews comprising any system of blades with separate or associated pivotal links such as rotulas, cardan joints, yielding members and the like.

What I claim is:

1. In a propelling airscrew with pivotal blades adapted to be automatically adjusted in pitch, comprising a rotary hub, a plurality of blades fitted therein, a pivot for each blade parallel to the axis of the blade and engaging the zone through which said blade is carried by the hub for allowing a pivotal movement of said blade round its axis, an intermediary link to which said pivot is pivotally secured round a drag axis parallel to the axis of rotation, a thrust pivot connecting said link with the hub adapted to allow the pivotal movement of the blade in a plane perpendicular to the plane of rotation of the blade system, a lever rigid with the inner end of each blade and a cam located on the hub and cooperating with said lever, said thrust pivot being positioned, with respect to the blade, beyond a plane parallel to the axis of said pivot and containing the axis of rotation of the airscrew.

2. A propelling airscrew as in claim 1, wherein the drag axis of each blade is as near as possible to the axis of rotation of the airscrew.

RENÉ DORAND.

REFERENCES CITED

The following references are of record in the file of this patent:

UNITED STATES PATENTS

| Number | Name | Date |
|---|---|---|
| 1,895,043 | Macaluso | Jan. 24, 1933 |
| 1,927,966 | Vaughn | Sept. 26, 1933 |
| 1,986,709 | Breguet | Jan. 1, 1935 |
| 2,428,200 | Campbell | Sept. 30, 1947 |
| 2,432,677 | Platt | Dec. 6, 1947 |

FOREIGN PATENTS

| Number | Country | Date |
|---|---|---|
| 811,726 | France | Apr. 21, 1937 |
| 859,367 | France | Dec. 17, 1940 |